(12) United States Patent
Anand et al.

(10) Patent No.: US 9,432,295 B2
(45) Date of Patent: Aug. 30, 2016

(54) SYSTEMS AND METHODS FOR HIGH THROUGHPUT TRAFFIC PATTERN GENERATION

(71) Applicant: TELEFONAKTIEBOLAGET L M ERICSSON (PUBL), Stockholm (SE)

(72) Inventors: Prashant Anand, Bangalore (IN); Arun Balachandran, Bangalore (IN); Vinayak Joshi, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/039,449

(22) Filed: Sep. 27, 2013

(65) Prior Publication Data

US 2015/0092549 A1    Apr. 2, 2015

(51) Int. Cl.
*G01R 31/08*   (2006.01)
*H04L 12/815*  (2013.01)
*H04L 12/26*   (2006.01)
*H04L 12/823*  (2013.01)
*H04L 12/24*   (2006.01)

(52) U.S. Cl.
CPC ............ *H04L 47/22* (2013.01); *H04L 41/5038* (2013.01); *H04L 43/50* (2013.01); *H04L 41/142* (2013.01); *H04L 41/145* (2013.01); *H04L 47/32* (2013.01)

(58) Field of Classification Search
CPC ........................................................ H04L 12/28
USPC ..................... 370/252–253, 235, 393–469; 709/203–230
See application file for complete search history.

(56) References Cited

U.S. PATENT DOCUMENTS

| | | | |
|---|---|---|---|
| 7,599,296 B2 * | 10/2009 | Tartarelli | H04L 12/2602 370/235 |
| 7,844,432 B1 | 11/2010 | Jones | |
| 8,503,325 B2 * | 8/2013 | Watanabe et al. | 370/252 |
| 2005/0050246 A1 * | 3/2005 | Lakkakorpi | H04L 12/5695 710/36 |
| 2008/0043748 A1 | 2/2008 | Balakrishnan et al. | |
| 2012/0095728 A1 * | 4/2012 | Ubukata | G06F 11/3409 702/186 |

* cited by examiner

*Primary Examiner* — Iqbal Zaidi
(74) *Attorney, Agent, or Firm* — Patent Portfolio Builders, PLLC

(57) ABSTRACT

A method of generating network traffic in a network device of a data communication network includes providing traffic generation parameters in the network device that describe a desired traffic pattern to be generated by the network device, generating a trigger packet in the network device, the trigger packet specifying a drop precedence for packets generated by the network device in a state defined by the trigger packet, replicating the trigger packet to provide a packet train, selectively dropping one or more packets in the packet train based on the drop precedence specified in the trigger packet, and transmitting the packet train from the network device.

20 Claims, 5 Drawing Sheets

SYSTEMS AND METHODS FOR HIGH THROUGHPUT TRAFFIC PATTERN GENERATION

FIELD

The present inventive concepts related to computer communication networks, and in particular for systems and methods for generating network traffic for use in analyzing network operations.

BACKGROUND

As data communication networks become more and more pervasive, there is an increasing level of interest in optimizing network performance and improving network utilization in terms of throughput, end to end delay, packet loss, etc. For example, data communication networks may be analyzed and optimized for purposes of congestion handling, capacity estimation, and deep visualization of network performance, among others.

Network performance analysis and optimization requires an understanding of the actual traffic carried by the network, including the statistical properties of the network traffic. There are a number of mathematical models that can be used to model the statistical properties of real world network traffic. A common practice in network design is to create a simulation model of a network or device and subject the model to a traffic pattern created by the traffic models. The results from the simulation are used to fine-tune parameters of the device or network, such as queue length, buffer sizes, etc. However, as this approach involves modeling the network device and its characteristics, the analysis may suffer from simulation inaccuracies if assumptions made in generating the network model are incorrect.

Modern data communication networks are designed to carry a heterogeneous mix of traffic classes, including voice, video and data services. Thus, various mathematical models may be used in the analysis and testing of such systems.

There are a number of mathematical models for generating traffic that mimic real world traffic carried by a network. One of the basic traffic models is the Bernoulli source model, which generates packets at random intervals. A Bernoulli source is a non-correlated packet source. That is, new packets are generated based on probabilities that are independent of any previous event. The load offered by a Bernoulli traffic source is specified by 'p', probability of a packet arrival in a given time slot, which is independent of arrivals in previous time slots.

A second type of traffic source is an On-Off traffic source. The On-Off source operates as a two state Markov Chain. In the ON state, the source generates a packet with a defined level of probability. In the OFF state, no packets are generated. Two parameters are required for the On-Off traffic source: offered load, and average burst length.

Bernoulli source models and On-Off Discrete Markov Source Models will now be discussed in more detail.

Bernoulli Traffic Source Model

The Bernoulli traffic source generates packets according to a Bernoulli discrete random process. A single parameter, p (probability of arrival), is specified for the source. The offered load per input port is equal to the probability of arrival, p. Assume that the probability p of arrival is given as follows:

$$\text{Prob}(1 \text{ arrival}) = p \quad [1]$$

while the probability of no arrival is given as:

$$\text{Prob}(0 \text{ arrivals}) = 1-p \quad [2]$$

The Bernoulli source model is a memoryless process. That is, knowledge of a past arrival does not help predict a current or future arrival.

The Bernoulli distribution is only relevant when traffic intensity to an ingress port is less than 100%.

On-Off Discrete Markov Source Model

An On-Off Markov Modulated Process (MMP) is a bursty traffic source model of a discrete-time, 2-state (ON or OFF) Markov process. A MMP rapidly changes the injection process for bursty traffic. In an MMP source, the rate of a Bernoulli injection process is modulated by current state of Markov chain. A two state Markov chain is illustrated in FIG. 1.

As shown therein, a source can be modeled with two states, namely, "ON" and "OFF". In the ON state, the source has an injection rate of r1; in the OFF state, the injection rate is 0. At each simulation loop, the probability of transitioning from the OFF state to the ON state is 'a', while the probability of transitioning from the ON state to the OFF state is 'b'. Accordingly, the probability of staying in the OFF state (i.e., transitioning from the OFF state to the OFF state), while the probability of staying in the ON state (i.e., transitioning from the ON state to the ON state) is 1−b.

This two state MMP model represents a bursty injection process, in which during the bursts (i.e., in the ON state), injection occurs with an overall rate r1 with random inter packet delays, and outside the bursts (i.e. in the OFF state), the injection process is quiet.

Moreover, in this MMP model, the average length of a burst is given by 1/b and average time between bursts is 1/a (i.e. the "quiet time"). To determine the injection rate, a steady state distribution between the on and off states is assumed. The probability of being in the OFF state is x0, while the probability of being in the ON state is x1. Then in steady state:

$$ax0 = bx1 \quad [3]$$

where $$x0 + x1 = 1 \quad [4]$$

The steady state probability of being in the ON state is given as:

$$x1 = a/(a+b) \quad [5]$$

Therefore, the injection rate r of this MMP is given as:

$$r = r1 * x1 = a * r1/(a+b) \quad [6]$$

From equation[6], it is clear that injection rate during the burst period is 1+(b/a) times the average injection rate. The larger the ratio of b to a, the more intense is the rate during the burst period. For example, for the following parameters Average load: r=40%
b=0.01
a=0.005

The ratio of b/a=0.01/0.005=2. So, at the offered rate of 40% of capacity, the MMP process alternates between periods of no packet injections and Bernoulli at a load of 40 (1+2)=120% of capacity. This level of burstiness may increase the average latency and/or reduce the saturation throughput of the device or system under consideration.

The On-Off model is a special case of Markov based traffic models in which there are at most 2 states. However, in general, a Markov-based traffic model may be represented as an n-state continuous time Markov process M={M(t)} t=0 to ∞, where the state space is {S1, S2, ... , Sn}. That is, M(t)∈{S1, S2, ... , Sn}.

Qualitatively, this means that the system can switch among any one of n different states, each of which may represent a different level of network traffic.

The process M stays in state Si for an exponentially distributed holding time, and then jumps to state Sj with probability Pij. More generally, all the state transitions (e.g. transitions from state S1 to S2, S5 to S4, S3 to Sn, etc.), are governed by a probability state matrix P≤[Pij], were Pij represent the probability of transition from state i to j.

Markov modulated traffic models constitute an important class of traffic models. In these models, the probability law of traffic arrivals in determined by the specific state in which the Markov process M is in. For example, while M is in state Sk, the probability law of traffic arrivals is completely determined by k, a property which holds for every value of k from 1 to n. When the Markov process M undergoes a transition to, for example, state Sj, then a new probability law takes effect for the duration of state Sj, and so on.

The most commonly used Markov-modulated model is a MMPP (Markov-Modulated Poisson process) model. In an MMPP, the modulation mechanism simply stipulates that in the state Sk of the process M, arrivals occur according to a Poisson process at rate λK. As the state changes, so does the rate.

Traffic Models and SLA Analytics.

Ensuring that performance requirements of data communication networks are met requires accurate verification and monitoring of Service Level Agreements (SLAs) to which the networks are subject. An SLA analytics tool set with rich features is almost a mandatory component of any IP vendor portfolio. Network SLA verification involves evaluation of a network's key performance indicators (e.g., bandwidth, jitter, latency, loss, etc.) under different traffic profiles (described by parameters, such as traffic type, rate, pattern etc). These traffic profiles are the result of traffic flows generated by applications at a higher level.

In statistical classification, traffic flows are identified based on their behavior. The 'behavior' of a traffic flow is quantified by observing packet arrivals for that flow belonging to a particular application type, and may discriminated from a known behavioral mode of an application type. The statistical characteristics of a traffic flow include mean inter-packet delay, packet size, arrival pattern etc. Mathematical traffic sources models can be used to generate traffic flows with these statistical parameters. Such sources can be used in the training phase of SLA analyzers.

FIG. 2 illustrates an architectural over view of a setup used for SLA analytics. As shown therein, a SLA analyzer 10 sends measurement configuration and setup information to a sender 20. Based on the configuration data provided by the SLA analyzer 10, the sender 20 sends measurement traffic through an IP network 30 to a receiver 40. The receiver prepares measurement reports and sends the measurement reports to the SLA analyzer 10.

Performance testing is largely done using a third party test equipment. These solutions are typically expensive and inflexible. Newer hardware and software modules need to be purchased for test cases covering emerging applications and scaling requirements.

SUMMARY

A method of generating network traffic in a network device of a data communication network includes providing traffic generation parameters in the network device that describe a desired traffic pattern to be generated by the network device, generating a trigger packet in the network device, the trigger packet specifying a drop precedence for packets generated by the network device in a state defined by the trigger packet, replicating the trigger packet to provide a packet train, selectively dropping one or more packets in the packet train based on the drop precedence specified in the trigger packet, and transmitting the packet train from the network device.

Using the methods described herein, actual traffic may be generated out of a router/switch line card based on an MMPP and/or Bernoulli traffic source model. Such traffic may be useful for testing/characterizing a network and/or device under test and may obviate the need for expensive additional test equipment.

The traffic generation parameters may include a load factor for a Markov modulated Poisson process that describes a level of traffic of the desired traffic pattern to be generated by the network device.

The traffic generation parameters may include a bandwidth of the desired traffic pattern to be generated by the network device.

The method may further include shaping the packet train in a traffic shaping queue to provide a shaped packet train having a desired bandwidth.

The trigger packet may further specify a replication count n. Replicating the trigger packet in the data plane of the device includes replicating the trigger packet n times.

The method may further include generating a second trigger packet in the network device specifying a second drop precedence for packets generated by the network device in a second state. The second trigger packet may specify a second replication count.

The trigger packet may further specify an output port and/or an output queue for the packet train, and transmitting the packet train from the network device may include transmitting the packet train over the specified output port and/or output queue.

Selectively dropping the one or more packets in the packet train may include passing the packet train through a weighted random early discard queue that is configured to selectively drop and/or mark packets based on a drop probability that is related to the specified drop precedence.

The traffic generation parameters may include a load factor for a Markov modulated Poisson process that describes a level of traffic of the desired traffic pattern to be generated by the network device, and the drop probability may be derived from the load factor.

The weighted random early discard queue may be configured to selectively drop and/or mark packets based on a drop probability profile that is selected based on the specified drop precedence.

Providing the traffic generation parameters may include running an offline traffic generation model to identify state transitions and/or arrival patterns of selected traffic sources.

The method may further include generating a load factor of a Poisson process in response to the state transitions and/or arrival patterns of the selected traffic sources.

A communication device of a data communication network includes a memory including traffic generation parameters that describe a desired traffic pattern to be generated by the communication device, a control processor configured to generate a trigger packet specifying a drop precedence for packets generated by the network device in a state defined by the trigger packet, a data plane processor configured to receive the trigger packet and to replicate the trigger packet to provide a packet train, and an output queue configured to selectively drop one or more packets in the packet train based on the drop precedence specified in the trigger packet and to transmit the packet train from the communication device.

The traffic generation parameters may include a load factor for a Markov modulated Poisson process that describes a level of traffic of the desired traffic pattern to be generated by the communication device. The traffic generation parameters may also include a bandwidth of the desired traffic pattern to be generated by the communication device.

The communication device may further include a traffic shaping queue configured to shape the packet train to provide a shaped packet train having a desired bandwidth.

The trigger packet may further specify a replication count n, and wherein the data plane processor is configured to replicate the trigger packet n times.

The control processor may be configured to generate a second trigger packet specifying a second drop precedence for packets generated by the communication device in a second state.

Some embodiments provide a communication device including a memory including a state table that stores traffic generation parameters that describe a desired traffic pattern to be generated by the communication device in various states, a data plane processor that generates a trigger packet that specifies a drop precedence based on an entry in the state table relating to a first state and that replicates the trigger packet to provide a packet train, and an output queue that selectively drops one or more packets in the packet train based on the drop precedence specified in the trigger packet and to transmit the packet train from the communication device. The trigger packet may include a first trigger packet, and the data plane processor may generate a second trigger packet specifying a second drop precedence for packets generated by the communication device in a second state.

The data plane processor may include a packet processing pipeline, and the replication of the trigger packet may be performed in the packet processing pipeline.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
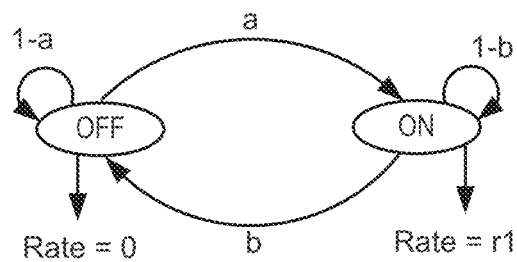
FIG. 1 illustrates a two state Markov chain.
Figure 2:
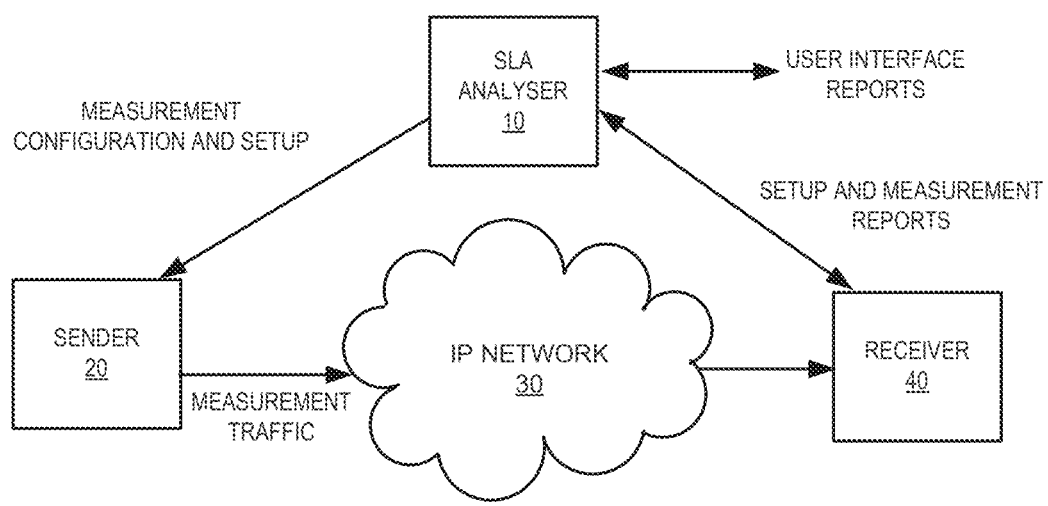
FIG. 2 illustrates an architectural over view of a setup used for SLA analytics.

Embodiments of the present invention are described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide systems/methods for generating precise traffic patterns in a data communications system with high throughput for system analysis. The traffic patterns may be based on mathematical models, and may be generated using real hardware, such as a switch or router, in a network under test. Systems/methods according to some embodiments may be used to measure and/or characterize the performance of actual hardware devices and/or real networks. Generation of such traffic from an actual network device, such as a switch or a router, can obviate the need for expensive (and often unavailable) devices for traffic generation in many cases. Furthermore, some embodiments may provide pattern generation methods from the control plane of the network, which allows the traffic to be generated with a pattern having a desired scale and/or accuracy.

As noted above, performance testing is typically done using expensive third party test equipment. These solutions may be inflexible when network environments are changed. Moreover, it may be necessary to purchase newer hardware and/or software modules for test cases covering emerging applications and scaling requirements. The systems/methods described herein may serve as a cost effective alternative to conventional traffic pattern generators.

Some embodiments provide systems/methods that generate a source traffic pattern based on Markov modulated Poisson traffic source model (MMPP) and/or a Bernoulli source traffic model, however the invention is not limited thereto. These systems/methods can be implemented in the line cards of routers or switches whose ports can be used as traffic sources for generating traffic directed towards a device under test (DUT). The traffic thus generated can be used for performance testing of switches and routers.

Embodiments described herein generate actual traffic out of a router/switch line card based on an MMPP and/or Bernoulli traffic source model. However, other types of traffic source models can be simulated.

Implementation of an MMPP traffic model in a router line card according to some embodiments may include the following steps. First, an offline MMPP or Bernoulli traffic generation model is run. The state transitions and arrival patterns of the traffic sources are captured to generate a simulation data trace. For an MMPP model, the load factor of the Poisson process is determined Determining the load factor of a Poisson process using known and/or simulated arrival patterns is well known in the art.

The simulation data trace is loaded into the data plane memory of a router line card. Certain parameters of the data plane of the router line card are configured, including Weighted Random Early Discard (WRED) settings and the traffic shaping queues, based on the simulation data.

The WRED feature of the output queue is configured based on the load factor of the Poisson arrival process in each state. Different WRED profiles that apply to packets with different drop precedence are configured. This will be used to achieve Poisson traffic sources with different load factors, as described in more detail below.

Weighted Random Early Discard (WRED) is a feature of modern data communication equipment that is provided to avoid buffer overflows in the equipment. WRED refers to the intentional discarding or marking of packets in a network device as a probabilistic function of queue fullness before overflow conditions are reached. A WRED process samples packets waiting on a congested queue, and drops or marks them based on a defined probability P.

Traffic shaping queues are used to provide a traffic stream with a desired load. Traffic shaping queues are configured based on the average bandwidth requirement of the traffic generation process. Traffic generation is performed according to some embodiments by a replication process in the data plane, as opposed to the control plane, of the device.

Figure 3:
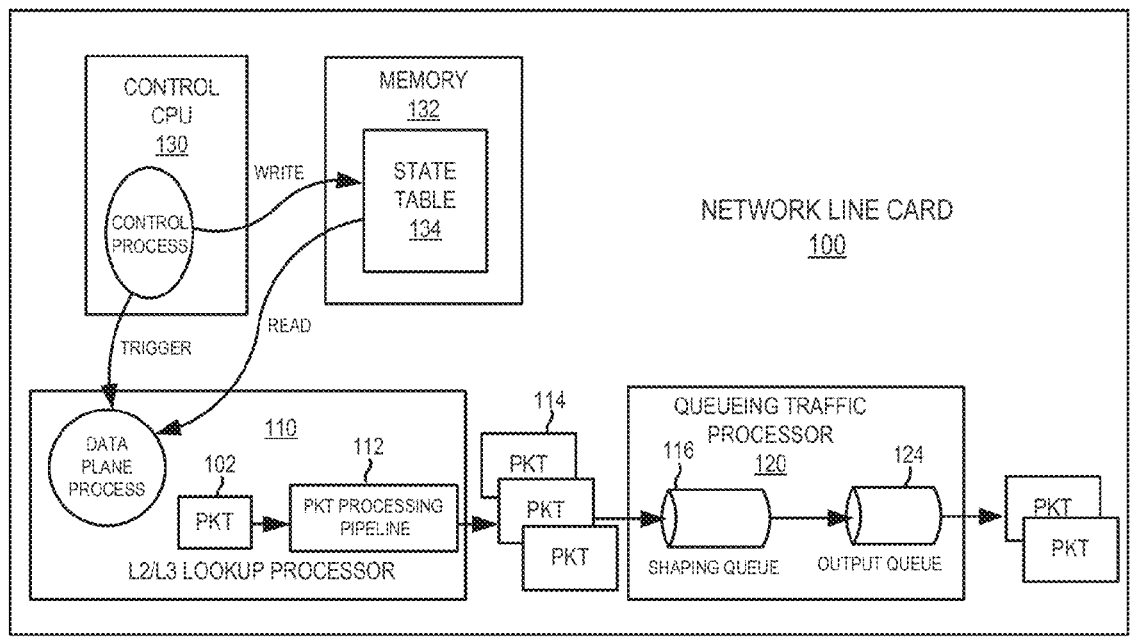
FIG. 3 illustrates a system for generating network traffic in accordance with some embodiments.

Systems/methods for generating network traffic in accordance with some embodiments are illustrated in FIG. 3. As shown therein, an individual network line card 100, such as may be present in a network router or a network switch, is provided. The line card 100 includes a layer 2/layer 3 (L2/L3) processor 110, a queuing and traffic processor 120 and a local control CPU 130. The control CPU 130 and the L2/L3 processor 110 are configured to access a shared memory 132 in which a state table 134 is stored. The configuration shown in FIG. 3 is exemplary only. An actual implementation may use more or fewer processors than shown in FIG. 3. For example, the control CPU 130, the L2/L3 processor 110 and the queuing and traffic processor 120 may be implemented as different threads, domains, virtual spaces or virtual machines on the same physical processor.

The L2/L3 processor 110 performs forwarding, lookup and packet replication tasks. The queuing and traffic processor 120 hosts shaping and output queues 116, 124 and performs quality of service (QoS) functions, such as scheduling, shaping, congestion control etc. The control CPU 130 handles the control traffic. The control CPU 130 can transmit and receive packets to/from a packet processing pipeline 112.

After setting up a system as described above, a measurement process in the control CPU 130 generates a trigger packet 102 having a data context including an output port, and an output queue. The data context of the trigger packet also defines a drop precedence corresponding to a respective state in the Markov chain. The control CPU 130 injects the trigger packet 102 into the packet processing pipeline 112. Depending on offline the simulation data, the packet processing pipeline 112 is configured to replicate the trigger packet a selected number of times n.

State transitions may be initiated by the control CPU 130 to provide varying levels of traffic intensity. In some embodiments, state transitions can be automatic, or can be triggered by a CPU process. In some embodiments, state transitions may be effected by sending a new trigger packet with a different data context. In other embodiments, the initial trigger packet or another communication sent by the control CPU 130 may reference the state table 134, and the data plane process may use the state table 134 as a basis for state changes. Thus, for example, the data plane process may read the state table 134 and generate trigger packets 102 corresponding to different states of the MMPP model. In that case, the control process may set up the state table 134 in memory and initiate the data plane process with an interprocess communication message, a trigger packet or the like.

The replication of the trigger packet 102 creates a packet train 114 of a desired load on an output port/queue of the device. The replicated packets are passed through the traffic shaping queue 122 to create a packet train 116 having a uniform inter-packet delay and a desired bandwidth. The packet shaping queue 122 may, for example, limit the bandwidth of packets passing through the queue to the desired bandwidth.

The WRED feature on the output queue 124 drops random packets from the packet train 116 based on a configured drop probability. Although the packets enter the output queue 124 with a uniform inter packet delay, packets emitted out of the output queue 124 have random inter packet delays after operation of the WRED function due to the random nature of WRED drops. Thus, random inter packet gaps are introduced into the packet train by the WRED function. Hence, the traffic output from the WRED enabled output queue 124 may have a traffic pattern similar to a Bernoulli traffic source.

Accordingly, some embodiments may use the packet replication and/or WRED mechanisms already present in switches and routers for generating an MMPP/Bernoulli traffic source based on input from the control plane of the line card 100.

In its generic form, Random Early detection (RED) is the probabilistic discard or marking of packets as a function of queue fill before the overflow conditions are reached. The WRED function samples packets waiting on a congested queue and drops packets based on a probability p. Thus, a WRED enabled queue passes a packet with a probability $(1-p)$. In effect, the WRED queue acts as a filter to emulate Bernoulli traffic source with an arrival probability of $(1-p)$.

Figure 4:
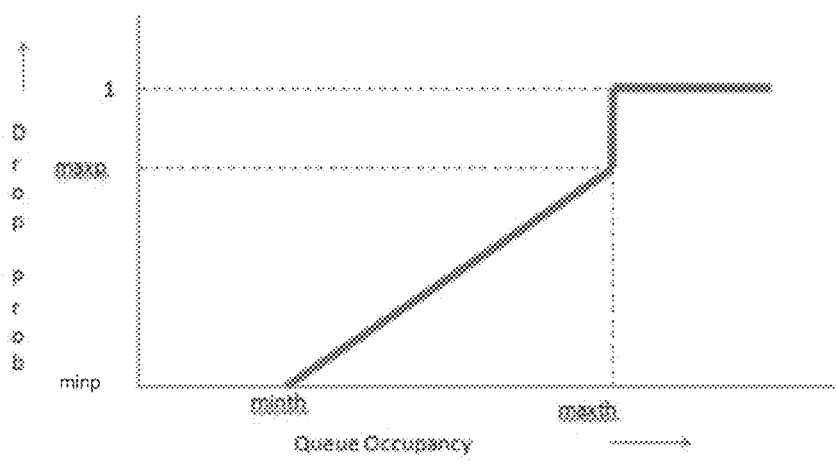
FIGS. 4-6 illustrate packet drop profiles for weighted random early discard functions in a network device in accordance with some embodiments.

An example of a WRED profile is shown in FIG. 4, which is a graph of packet drop probability p versus queue occupancy level for a WRED-enabled queue. In the example shown in FIG. 4, the drop probability p is a minimum level minp (which may be zero), for queue occupancy levels below a minimum threshold level minth Once the queue occupancy reaches the minimum threshold level minth, the drop probability increases linearly with queue occupancy until the queue occupancy reaches a maximum threshold maxth at a drop probability of maxp, at which point the drop probability increases stepwise to 1.0 for any further increase in queue occupancy.

Figure 5:
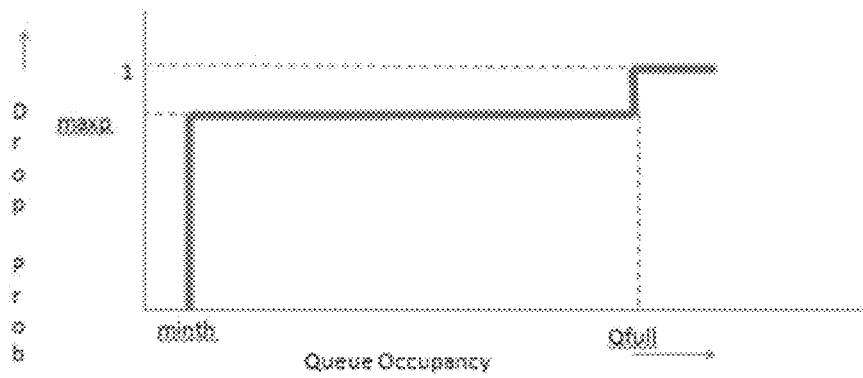

FIG. 5 illustrates a WRED profile suitable for MMPP traffic generation. In the profile shown in FIG. 5, a single probability maxp is defined for values of queue occupancy above a minimum threshold level minth. When the queue is full, the drop probability increases to 1.0.

Figure 6:
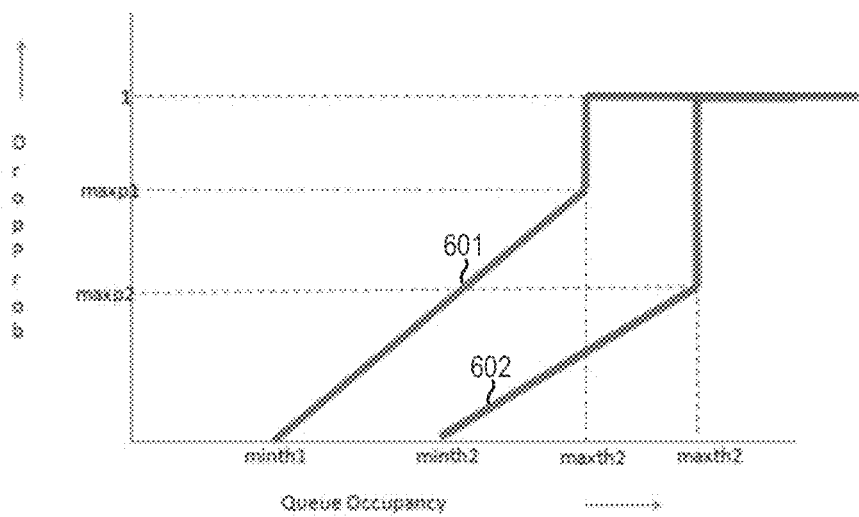

FIG. 6 illustrates a WRED profile with multiple drop profiles 601, 602. The first drop profile 601 follows a linear pattern from minth1 to maxth1 then rises to 1, while the second drop profile 602 follows a linear pattern from minth2 to maxth2 then rises to 1.

Figure 7:
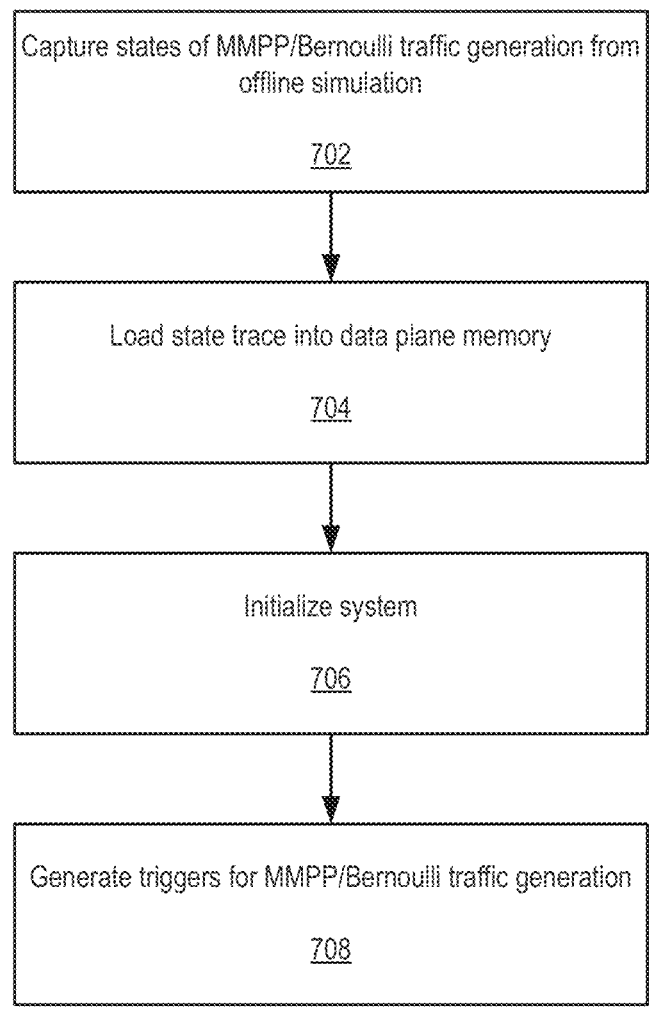
FIGS. 7 and 8 are flowcharts that illustrate systems/methods according to some embodiments.

Methods of packet generation are illustrated in the flowchart of FIG. 7. As shown therein, the methods include running an offline simulation model and capturing the states of MMPP/Bernoulli traffic generation (block 702) to generate a state trace. The state trace is then loaded in the memory 132 in the data plane of a network device, such as a switch or router (block 704). The system is then initialized, and the data path is set up (block 706). The control CPU then generates triggers for MMPP traffic/Bernoulli traffic generation in the device (block 708).

To generate the simulation model, an offline MMPP/Bernoulli traffic model is created and run for a specified duration of time. The Markov state transitions and the number of Poisson arrivals in each state are captured as a trace in a database. A sample database thus generated is shown below in Table 1. Each entry in the database includes the State (S), the load factor ($\lambda$), the number of trials (trials) and the number of packets generated (N). The example shown in Table 1 consists of four states S1 to S4.

TABLE 1

State Trace

| Time (t) | State (S) | Load factor ($\lambda$) | Number of Bernoulli trials (trials) | Number of packet arrivals (N) |
|---|---|---|---|---|
| 1 | S1 | 0.5 | 100 | 50 |
| 2 | S2 | 0.1 | 70 | 60 |
| 3 | S3 | 0.3 | 55 | 40 |
| 4 | S2 | 0.1 | 80 | 10 |
| 5 | S4 | 0.1 | 200 | 25 |
| 6 | S2 | 0.9 | 10 | 9 |
| ... | | | | |
| 10 | S2 | 0.1 | 50 | 6 |

A control process running on the control CPU 130 loads the simulation data into the memory 132. The control process also triggers a data plane process in the control CPU 130 that starts the traffic generation.

The traffic shaping queues are configured according to the bandwidth and packet gap requirements. For example, if the interface speed is 40 Gbps and the average bandwidth at which the simulated traffic is to be generated is 10 Gbps, then the shaper is configured to limit the packet bandwidth to 10 Gbps.

Each state Si of the MMPP model is characterized by a distinct Poisson arrival rate $\lambda i$. The WRED feature of the output queue 124 is configured based on this $\lambda i$.

As noted above, a WRED configuration may specify different drop probabilities for various levels of queue occupancy. The action specified is a drop/mark. In some embodiments, a single probability may be configured for a very low level of queue fill as shown, for example, in the profile of FIG. 5.

As a result of this configuration, any packet that arrives at the output queue has a probability P of being dropped/marked. The probability-based drop will result in an output stream of packets similar to one originating from a Bernoulli traffic source with arrival probability (1−P). The probability P can be derived from the Poisson load factor $\lambda i$. For example, if $\lambda i$=0.7, then P=1−0.7=0.3.

In some embodiments, the output queue 124 can be configured with different drop profiles each relating to a different traffic class as illustrated, for example, in FIG. 6. The appropriate WRED profile may be selected based on the drop precedence of the packets sampled. This flexibility in configuration can be made use to emulate Bernoulli traffic sources with different traffic rates.

Referring again to FIG. 3, the data plane process in the control CPI 130 emulates a Markov chain M with state space={S1, S2, . . . , Sn}. The control CPU 130 reads successive entries of the offline database D at discrete time instances. For each state Si, the control CPI 130 creates a trigger packet and sets a data context in the forwarding path.

The data context may specify the output port, output queue, drop precedence and/or the replication count for the packet. The drop precedence selects the WRED drop profile on the output queue, which in turn determines the arrival rate of the Poisson source in state Si.

The trigger packet is injected into the packet processing pipeline and is replicated n times by the L2/L3 processor 110, creating a packet train 114.

The packet 114 train thus generated is queued to an output queue 124 which is pre-configured for WRED congestion control as described above.

In MMPP, the states of the Markov chain modulates a Poisson traffic source with a different load parameter $\lambda$. When the data plane process in the control CPU 130 wants to simulate a state change, a trigger packet can be sent with a different drop precedence. This will enable the selection of a different drop profile on the output queue and therefore a different Poisson rate.

Figure 8:
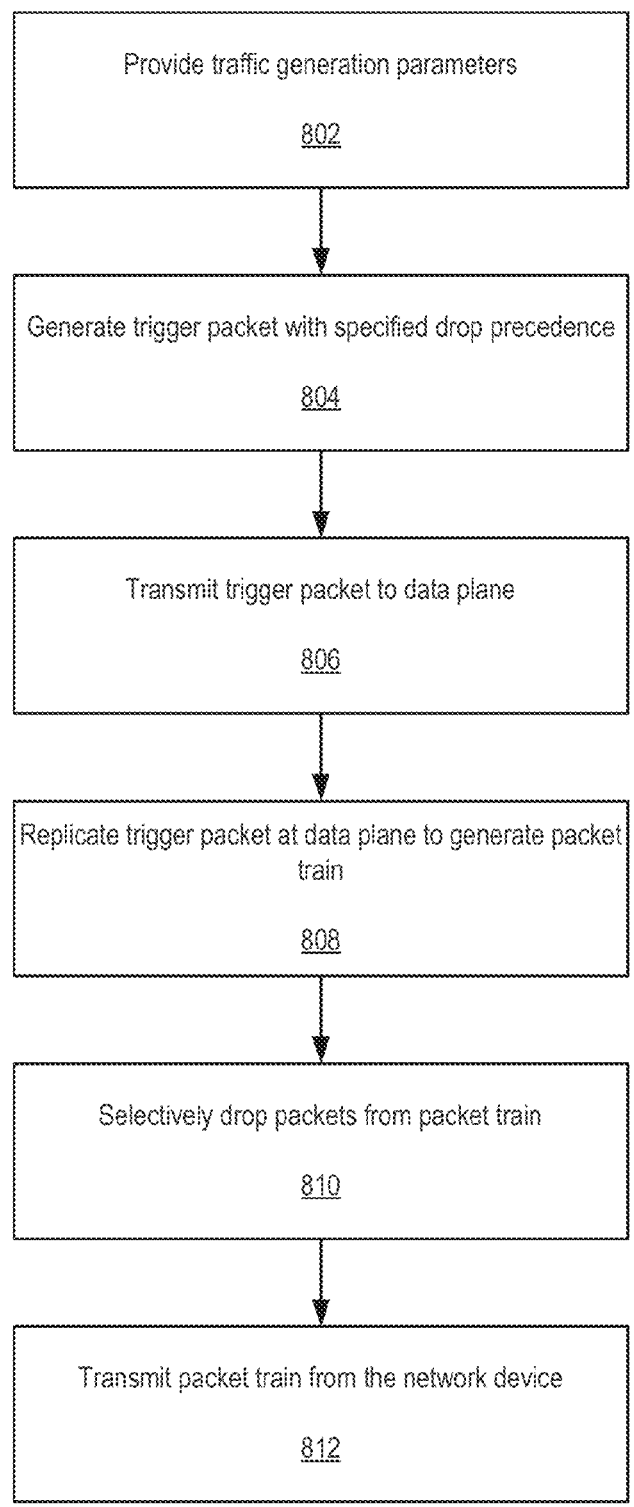

FIG. 8 illustrates embodiments of the present inventive concepts in more detail. As shown therein, the systems methods may provide traffic generation parameters that describe a desired traffic pattern to be generated by the network device. (Block 802) The traffic generation parameters may be provided in a control plane of the network device. A trigger packet is generated in the control plane of the network device (Block 804). The trigger packet specifies a drop precedence for packets generated by the network device in a current state defined by the trigger packet. The trigger packet is then transmitted to the data plane of the network device (Block 806).

At the data plane, the trigger packet is replicated a number of times to form a packet train (Block 808). One or more packets in the packet train are selectively dropped, for example, using a WRED feature of the network device, based on the drop precedence specified in the trigger packet (Block 810). Finally, the packet train is transmitted from the network device to provide the desired traffic pattern for use in testing/analysis/characterization of the network (Block 812).

In this manner, actual traffic may be generated out of a router/switch line card based on an MMPP and/or Bernoulli traffic source model. Such traffic may be useful for testing/characterizing a network and/or device under test.

As will be appreciated by one of skill in the art, the present invention may be embodied as a method, a system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java or C++. However, the computer program code for carrying out operations of the present invention may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of generating network traffic in a network device of a data communication network, the method comprising:

providing traffic generation parameters in the network device that describe a desired traffic pattern to be generated by the network device, wherein the traffic generation parameters comprise a load factor for a Markov modulated Poisson process that describes a level of traffic of the desired traffic pattern to be generated by the network device;

generating a trigger packet in the network device, the trigger packet specifying a drop precedence for packets generated by the network device in a state defined by the trigger packet;

replicating the trigger packet a plurality of times to provide a packet train comprising a plurality of replicated instances of the trigger packet;

selectively dropping one or more packets in the packet train based on the drop precedence specified in the trigger packet, wherein selectively dropping the one or more packets in the packet train comprises passing the packet train through a weighted random early discard queue that is configured to selectively drop and/or mark packets based on a drop probability that is related to the specified drop precedence, the drop probability being derived from the load factor; and transmitting the packet train without the dropped one or more packets from the network device.

2. The method of claim 1, wherein the traffic generation parameters comprise a bandwidth of the desired traffic pattern to be generated by the network device.

3. The method of claim 1, further comprising shaping the packet train in a traffic shaping queue to provide a shaped packet train having a desired bandwidth.

4. The method of claim 1, wherein the trigger packet further specifies a replication count n, and wherein replicating the trigger packet in the data plane of the network device comprises replicating the trigger packet n times.

5. The method of claim 1, wherein the trigger packet comprises a first trigger packet, the method further comprising generating a second trigger packet in the network device, the second trigger packet specifying a second drop precedence for packets generated by the network device in a second state.

6. The method of claim 5, wherein the second trigger packet specifies a second replication count.

7. The method of claim 1, wherein the trigger packet further specifies an output port and/or an output queue for the packet train, wherein transmitting the packet train from the network device comprises transmitting the packet train over the specified output port and/or output queue.

8. The method of claim 1, wherein the weighted random early discard queue is configured to selectively drop and/or mark packets based on a drop probability profile that is selected based on the specified drop precedence.

9. The method of claim 1, wherein providing the traffic generation parameters comprises running an offline traffic generation model to identify state transitions and/or arrival patterns of selected traffic sources.

10. The method of claim 9, further comprising generating a load factor of a Poisson process in response to the state transitions and/or arrival patterns of the selected traffic sources.

11. A communication device of a data communication network, comprising:

a memory including traffic generation parameters that describe a desired traffic pattern to be generated by the communication device, wherein the traffic generation parameters comprise a load factor for a Markov modulated Poisson process that describes a level of traffic of the desired traffic pattern to be generated by the communication device;

a control processor configured to generate a trigger packet specifying a drop precedence for packets generated by the communication device in a state defined by the trigger packet;

a data plane processor configured to receive the trigger packet and to replicate the trigger packet a plurality of times to provide a packet train comprising a plurality of replicated instances of the trigger packet; and an output queue configured to selectively drop one or more packets in the packet train based on the drop precedence specified in the trigger packet and to transmit the packet train without the dropped one or more packets from the communication device, wherein the output queue is configured to process the packet train using a weighted random early discard function that selectively drops and/or marks packets based on a drop probability that is based on the specified drop precedence, the drop probability being derived from the load factor.

12. The communication device of claim 11, wherein the traffic generation parameters comprise a bandwidth or the desired traffic pattern to be generated by the communication device.

13. The communication device of claim 11, further comprising a traffic shaping queue configured to shape the packet train to provide a shaped packet train having a desired bandwidth.

14. The communication device of claim 11, wherein the trigger packet further specifies a replication count n, and wherein the data plane processor is configured to replicate the trigger packet n times.

15. The communication device of claim 11, wherein the trigger packet comprises a first trigger packet, wherein the control processor is configured to generate a second trigger packet specifying a second drop precedence for packets generated by the communication device in a second state.

16. The communication device of claim 11, wherein the trigger packet further specifies an output port and/or an output queue for the packet train.

17. The communication device of claim 11, wherein the weighted random early discard queue is configured to selectively drop and/or mark packets based on a drop probability profile that is selected based on the specified drop precedence.

18. A communication device of a data communication network comprising:

a memory including a state table that-stores traffic generation parameters that describe a desired traffic pattern to be generated by the communication device in various states, wherein the traffic generation parameters comprise a load factor for a Markov modulated Poisson process that describes a level of traffic of the desired traffic pattern to be generated by the communication device;

a data plane processor that generates a trigger packet that specifies a drop precedence based on an entry in the state table relating to a first state and that replicates the trigger packet a plurality of times to provide a packet train comprising a plurality of replicated instances of the trigger packet; and an output queue that selectively drops one or more packets in the packet train based on the drop precedence specified in the trigger packet and to transmit the packet train without the dropped one or more packets from the communication device, wherein the output queue is configured to process the packet train using a weighted random early discard function that selectively drops and/or marks packets based on a drop probability that is based on the specified drop precedence, the drop probability being derived from the load factor.

19. The communication device of claim 18, wherein the trigger packet comprises a first trigger packet, wherein the data plane processor is configured to generate a second trigger packet specifying a second drop precedence for packets generated by the communication device in a second state.

20. The communication device of claim 18, wherein the data plane processor comprises a packet processing pipeline, wherein the replication of the trigger packet is performed in the packet processing pipeline.

* * * * *